United States Patent
Kang (10) Patent No.: US 9,071,864 B2
(45) Date of Patent: Jun. 30, 2015

(54) METHOD AND APPARATUS FOR CORRECTING SYNCHRONIZATION ERRORS BETWEEN AUDIO SIGNALS AND VIDEO SIGNALS

(75) Inventor: Shin Suk Kang, Namyangju-si (KR)

(73) Assignee: DOUBLE U CORPORATION CO., LTD., Seoul (KR)

( * ) Notice: Subject to any disclaimer, the term of this patent is extended or adjusted under 35 U.S.C. 154(b) by 526 days.

(21) Appl. No.: 13/519,007

(22) PCT Filed: Dec. 27, 2010

(86) PCT No.: PCT/KR2010/009363
§ 371 (c)(1),
(2), (4) Date: Jun. 25, 2012

(87) PCT Pub. No.: WO2011/081380
PCT Pub. Date: Jul. 7, 2011

(65) Prior Publication Data
US 2012/0328062 A1    Dec. 27, 2012

(30) Foreign Application Priority Data

Dec. 28, 2009  (KR) .......................... 10-2009-0131683
Sep. 20, 2010  (KR) .......................... 10-2010-0092381

(51) Int. Cl.
*H04L 7/00*      (2006.01)
*H04N 9/475*     (2006.01)
*H04N 21/43*     (2011.01)
*H04N 5/04*      (2006.01)

(52) U.S. Cl.
CPC ............. *H04N 21/4302* (2013.01); *H04N 5/04* (2013.01)

(58) Field of Classification Search
CPC .................................................. H04N 21/4302
See application file for complete search history.

(56) References Cited

U.S. PATENT DOCUMENTS

| | | | | |
|---|---|---|---|---|
| 5,844,600 A | * | 12/1998 | Kerr ........................... | 348/14.12 |
| 2003/0193616 A1 | * | 10/2003 | Baker et al. .................. | 348/515 |
| 2006/0257108 A1 | * | 11/2006 | Suguta ........................... | 386/95 |
| 2008/0297613 A1 | * | 12/2008 | Takahashi et al. .......... | 348/221.1 |
| 2009/0116563 A1 | * | 5/2009 | Kawamura et al. ....... | 375/240.26 |
| 2009/0180761 A1 | * | 7/2009 | Wand et al. .................. | 386/109 |

FOREIGN PATENT DOCUMENTS

| JP | 2000-165862 A | 6/2000 |
|---|---|---|
| JP | 2002281498 A | 9/2002 |
| JP | 2008-061010 A | 3/2008 |

* cited by examiner

*Primary Examiner* — Dave Czekaj
*Assistant Examiner* — Md Haque
(74) *Attorney, Agent, or Firm* — Brundidge & Stanger, P.C.

(57) ABSTRACT

The present invention relates to an apparatus and method for correcting synchronization errors, which involve correcting synchronization errors occurring between video signals and audio signals when multiple videos are combined. The apparatus and method of the present invention involve: storing synchronization errors between an initial video signal and an initial audio signal of each video to be combined when combining different pieces of video content; and combining multiple pieces of video content such that the initial synchronization error which is set to synchronize existing video signals with existing audio signals can be maintained when combining multiple pieces of video content. The apparatus and method of the present invention enable the drawbacks of conventional techniques, i.e. that video signals and audio signals are uniformly combined, errors are corrected, and thus the video signals and the audio signals are unsynchronized which results in unnatural video, to be overcome.

12 Claims, 5 Drawing Sheets

METHOD AND APPARATUS FOR CORRECTING SYNCHRONIZATION ERRORS BETWEEN AUDIO SIGNALS AND VIDEO SIGNALS

TECHNICAL FIELD

The present disclosure relates to an apparatus for correcting video synchronization errors, more specifically, a method and an apparatus for correcting synchronization errors between audio signals and video signals.

BACKGROUND ART

With respect to a case where a series of videos (live broadcasting videos) are encoded and aired in real time through encoding software such as Window Media Encoder, there are various encoding methods.

Firstly, there is an encoding method, which is direct from a capturing device. Secondly, there is an encoding method, which is indirect from a capturing device.

While the first encoding method has no problem because streaming data already include values corrected errors of A/V from the device, in case of the second encoding method, errors exist during a process of numerically calculating PTS (presentation time stamp) values of A/V based on FPS(frame per second).

For example, 30 FPS means that frames are outputted 30 times per second on a screen, which can be numerically expressed in (1000000000.0 nanosec/30.0)= 33333333.333333 . . . and refers to AvgTimePerFrame.

AvgTimePerFrame is significant for determining PTS and refers to a numerical value for determination as to how long videos should be displayed on a screen.

Upon calculating 30 frames per second based on calculated AvgTimeFrame, (33333333*30)=999999990, so that 10 nanosec of an error exists.

Furthermore, in case of a video capturing device, screens of 30 frames are captured corresponding to 30 FPS. However, in case of a personal capturing device such as a webcam, even if 30 FPS per second is set, 30 frames per second are not captured, and less than 30 FPS is captured, so that errors increase. In other words, there is a case where set FPS and the number of FPSs to be captured is inconsistent.

These numerical errors appear to errors between videos and audio during encoding and streaming processes for a long time, thereby causing difficulties in service.

The problem of these errors becomes especially serious in the case where video contents (including video signals and audio signals, and the same meaning applies hereinafter) are processed with different FPSs between a capturing device that generates videos and an encoding apparatus that encodes and transmits the videos.

In case of inserting a video content into another video content, synchronization errors between video signals and audio signals of the respective videos are different. Accordingly, in inserting a video into another video, it may be occurred that videos are played on a screen but sound is off, or sound is on but videos are not played on a screen.

This circumstance causes a problem especially in the case where commercial videos are inserted during public broadcasting. In case of inserting commercial videos during sport broadcasting, if videos are displayed but sound is off, or sound is on but no videos are displayed so that a black screen or others is displayed, viewers may have aversion.

DISCLOSURE OF THE INVENTION

Problems to Be Solved by the Invention

The present disclosure provides a method and an apparatus for correcting synchronization errors, which involve correcting synchronization errors occurring between video signals and audio signals of different videos when video contents are inserted or multiple video contents are combined, so that natural play of videos is realized.

The present disclosure also provides a method and an apparatus for correcting synchronization errors, which involve resetting FPS of videos while correcting synchronization errors between video signals and audio signals.

Means for Solving the Problems

A synchronization error correcting apparatus comprise a source selection unit for receiving video contents consisting of video signals and audio signals from multiple video sources and outputting the video contents; an error correction unit for extracting an initial synchronization error set in advance between the video signals and the audio signals of the multiple respective video contents; and a PTS adjustment unit for combining the multiple video contents by resetting presentation time stamps (PTSs) of the video signals and the audio signals of the multiple video contents to correspond to PTS of combined video contents generated after combination of the multiple video contents, and resetting the PTS while maintaining the initial synchronization error between the audio signals and the video signals of the respective combined video contents.

Furthermore, in inserting second video contents into first video contents, the PTS adjustment unit may sets the PTSs of the video signals and the audio signals such that the second video contents are combined in the middle of the first video contents, and the rest portions of the first video contents are combined to the end of the second video contents, while maintaining the initial synchronization error between the video signals and the audio signals of the first video contents when the rest portions of the first video contents are combined.

The synchronization error correcting apparatus, in accordance with one embodiment of the present disclosure, further may include a FPS adjustment unit for adjusting frame per second (FPS) of the video signals of the combined video contents based on FPS setting information included in setting information input from an encoder.

Further, the FPS adjustment unit may adjust the FPS of the video signals of the combined video contents by setting a time position of each video frame after the adjustment of the FPS based on the FPS setting information and using a video frame directly before the time position of the video frame set based on the FPS setting information among video frames of the video signals of the combined video contents prior to the FPS adjustment.

In addition, the synchronization error correcting apparatus, in accordance with one embodiment of the present disclosure, may further comprises a proportion-adjusting unit for adjusting a screen proportion of the video signals of the combined video contents that the FPS have been adjusted, based on screen proportion setting information included in the setting information input from the encoder.

Furthermore, the synchronization error correcting apparatus, in accordance with one embodiment of the present disclosure, may further comprise a resampling unit for resampling the audio signals that the PTS have been adjusted, based on resampling information included in the setting information input from an encoder.

Meanwhile, a method for correcting synchronization error, in accordance with one embodiment of the present disclosure, which is performed in a synchronization error correcting apparatus that corrects synchronization errors between video signals and audio signals of multiple video contents input from multiple video sources and combines and outputs the multiple video contents, comprising: (a) receiving first video contents from the video sources; (b) generating initial synchronization error information by receiving second video contents to be combined to the first video contents from the video sources, and extracting an initial synchronization error between video signals and audio signals of the second video contents; and (c) combining the second video contents to the first video contents based on the initial synchronization error information while maintaining the initial synchronization error between the video signals and the audio signals of the second video contents.

In inserting the second video contents into the first video contents, in step (a), the synchronization error correcting apparatus extracts an initial synchronization error of the first video contents, in step (c), the synchronization error correcting apparatus combines the second video contents in the middle of the first video contents while maintaining the initial synchronization error of the second video contents, and may further comprise (d) combining the first video contents to the end of the second video contents while maintaining the initial synchronization error of the first video contents, after the combination of the second video contents is finished.

Further, the synchronization error correcting apparatus may combine the first video contents and the second video content, by resetting PTSs of the first video contents and the second video contents to correspond to PTS of combined videos generated from the combination of the first video contents and the second video contents.

Also, the synchronization error correcting apparatus may convert FPS of video signals of the combined video contents, resample audio signals thereof, and output the video signal of the combined video contents, based on FPS setting information and resampling setting information received from an encoder.

In addition, the synchronization error correcting apparatus may adjust the FPS of the video signals of the combined video contents by setting a time position of each video frame of the combined video contents after the adjustment of the FPS based on the FPS setting information and using a video frame directly before the time position of the video frame set based on the FPS setting information among video frames of the video signals of the combined video contents prior to the FPS adjustment.

Furthermore, the synchronization error correcting apparatus may adjust a proportion of the video frames of the video signals of the combined video contents that the FPS have been converted, based on screen proportion setting information received from the encoder and output the video signal of the combined video contents.

A method for correcting synchronization error in accordance with one embodiment of the present disclosure may be provided the method for correcting synchronization error of claim 7 or 8 with a program code that can be read and executed in a computer.

Effect of the Invention

In combining different video contents, the present disclosure resolve problems that synchronization errors are changed since conventional techniques uniformly combine video signals and audio signals, so that video signals and audio signals are unsynchronized and thereby resulting in unnatural videos, by storing an initial synchronization error, which is set to enable optimum synchronization of video signals and audio signals with respect to the videos to be combined, and combining the multiple video contents while maintaining the existing initial synchronization error.

The present disclosure easily adjusts FPS of video signals of video contents to be combined by setting a time position of each video frame of the video contents to be combined after the adjustment of FPS based on FPS setting information input from an encoder, and using a video frame directly before the time position of the video frame set based on the FPS setting information among each video frames configured video signals of the video contents to be combined prior to the FPS adjustment.

BEST MODE FOR CARRYING OUT THE INVENTION

Referring to the accompanying drawings, the preferred embodiments of the present disclosure will be described.

Figure 1:
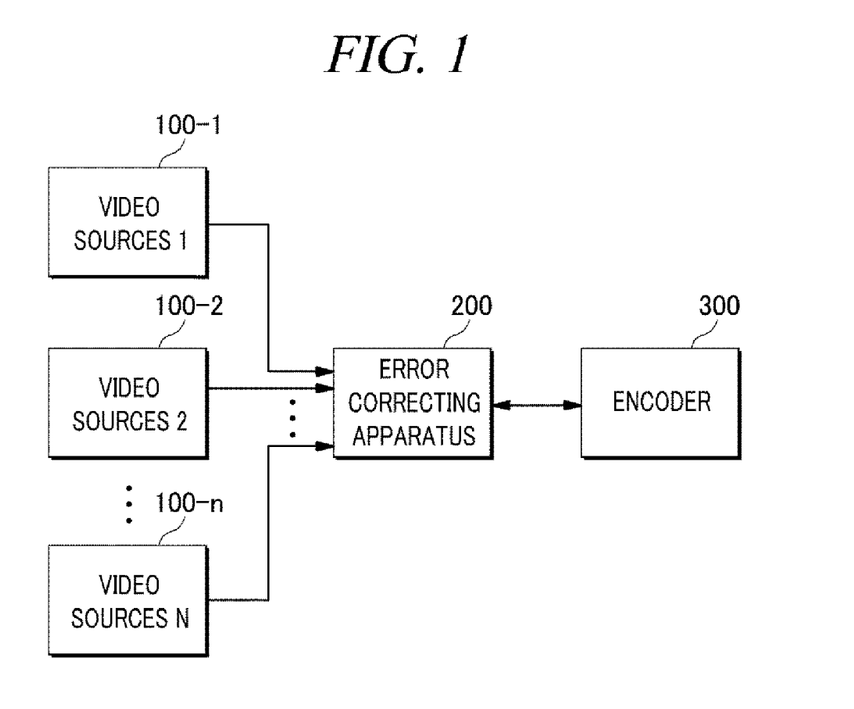
FIG. 1 illustrates whole configuration, in which an apparatus for correcting synchronization errors between audio signals and video signals is connected to video sources and an encoder in accordance with a preferred embodiment of the present disclosure.

FIG. 1 illustrates whole configuration, in which an apparatus 200 for correcting synchronization errors between audio signals and video signals is connected to video sources 100-1 to 100-n and an encoder 300 in accordance with a preferred embodiment of the present disclosure.

Referring to FIG. 1, the apparatus 200 for correcting synchronization errors between audio signals and video signals (hereinafter, referred to as the "synchronization error correcting apparatus") of the present disclosure receives video contents (including video signals and audio signals, which have been synchronized one another based on an initial synchronization error, and the same meaning applies hereinafter) as input from the multiple video sources 100-1 to 100-n.

In FIG. 1, the video sources 100-1 to 100-n may be devices that actually generate video contents by themselves such as webcams, programs decoding video files stored in a computer in advance, also decoders that receive, decode, and output digital broadcasting or etc. In other words, the video sources 100-1 to 100-n of the present disclosure are not limited in terms of hardware or software configuration, as long as it would be able to output video contents to the synchronization error correcting apparatus 200.

Furthermore, The synchronization error correcting apparatus 200 corrects synchronization errors between combined audio signals and video signals, resets FPS of video signals of video contents to be consistent with FPS requested by the encoder 300, resamples audio signals to correspond to the FPS of the video signals and outputs the video signals and the audio signals to the encoder 300.

Particularly, the synchronization error correcting apparatus 200 is capable of combining video contents input from the multiple video sources 100-1 to 100-n into one, and outputting to the encoder 300. In this case, the video contents input from the different video sources 100-1 to 100-n have different synchronization errors between video signals and audio signals and different FPSs. Thus, the synchronization error correcting apparatus 200 corrects synchronization errors between audio signals and video signals when it combines the video contents input from the different video sources 100-1 to 100-n. Then, the synchronization error correcting apparatus 200 converts FPS of the video signals and resamples the audio signals to correspond to the FPS of the video signals. Hereinafter, a case where a video is inserted into another videos, e.g., commercial videos are inserted during real-time videos such as sport broadcasting videos, will be described as an exemplary case.

Meanwhile, the encoder 300 transmits setting information which includes desired FPS setting information, resampling setting information, screen proportion setting information, and etc. The encoder(s) 300 encodes and transmits video contents received from the synchronization error correcting apparatus 200 to external network, or compresses and stores.

Figure 2:
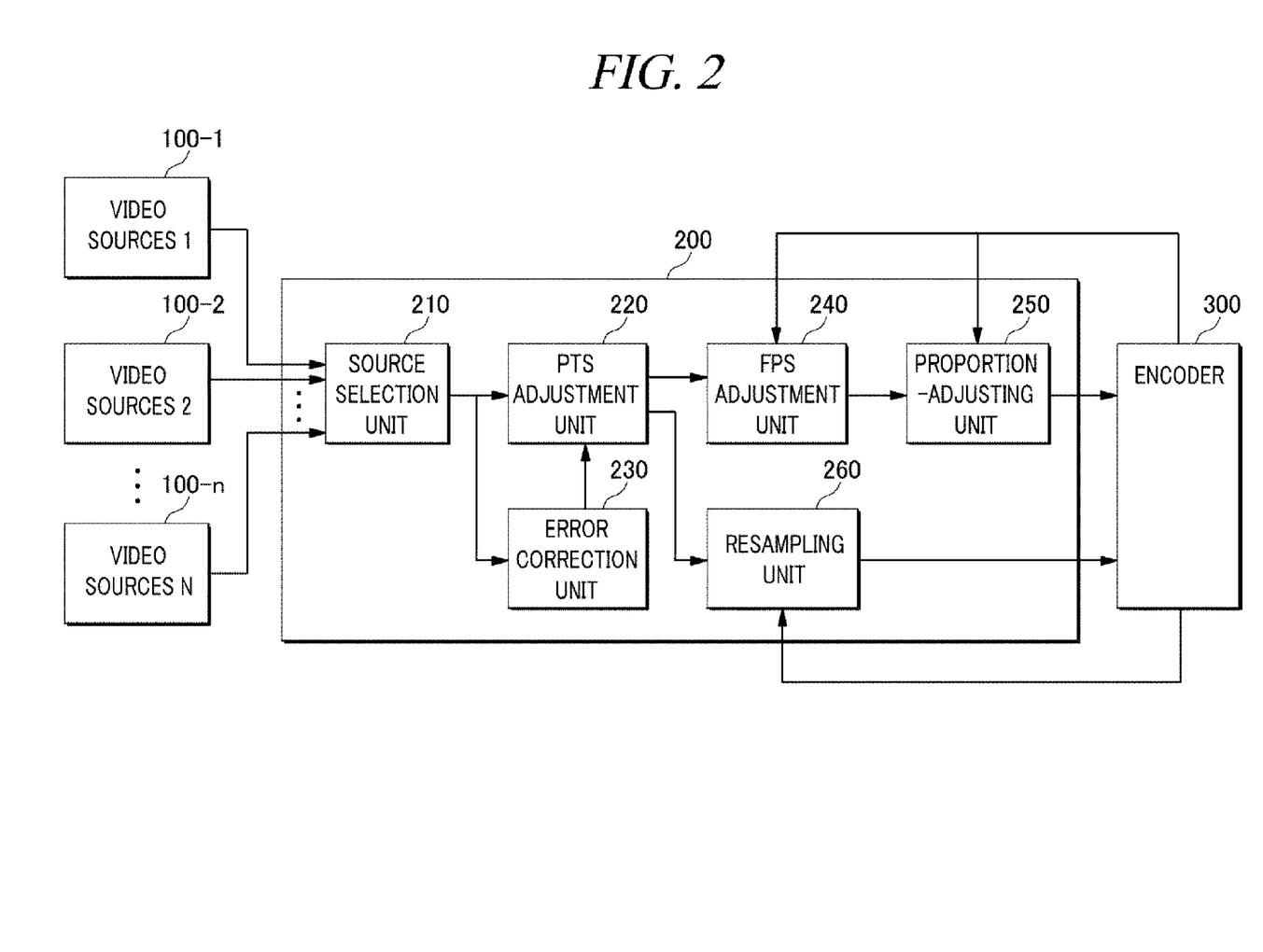
FIG. 2 illustrates detailed configuration of a synchronization error correcting apparatus in accordance with a preferred embodiment of the present disclosure.

FIG. 2 illustrates detailed configuration of the synchronization error correcting apparatus 200 in accordance with a preferred embodiment of the present disclosure.

Referring to FIG. 2, the synchronization error correcting apparatus 200 in accordance with a preferred embodiment of the present disclosure includes a video selection unit 210, a PTS adjustment unit 220, an error correction unit 230, a FPS adjustment unit 240, a proportion-adjusting unit 250, and a resampling unit 260.

First, the video selection unit 210 receives input of videos from a video source selected by a user or a manager among the multiple video sources 100-1 to 100-n, and outputs the videos to the PTS adjustment unit 220 and the error correction unit 230. For example, the video selection unit 210 selects the video source 1 (100-1), which is a sport broadcasting signal, and outputs video contents thereof. During the outputting, when an inning in a baseball game or a quarter in a pro-basketball game is changed, the video selection unit 210 selects a commercial video source (one of 100-2 to 100-N), which has been prepared in advance, and outputs commercial data thereof. When the commercial data are finished or the sports broadcasting is restarted, the video selection unit 210 selects the video source 1(100-1) once again and outputs the sports broadcasting videos.

The video contents output from the source selection unit 210 are input to the PTS adjustment unit 220. The error correction unit 230 extracts information of synchronization errors between video signals and audio signals of the video contents to be input to the PTS adjustment unit 220, and outputs the information to the PTS adjustment unit 220. In this case, the error correction unit 230 extracts initial synchronization error information between video signals and audio signals of each of the video contents, and outputs the information to the PTS adjustment unit 220.

The PTS adjustment unit 220 adjusts PTS defined in advance for each video to be PTS of a video generated by combining the multiple videos. In this case, the PTS adjustment unit 220 adjusts the PTS of the combined video by separately adjusting PTS of the video signals and PTS of the audio signals with considering the information of the initial synchronization error input from the error correction unit 230.

Figure 3:
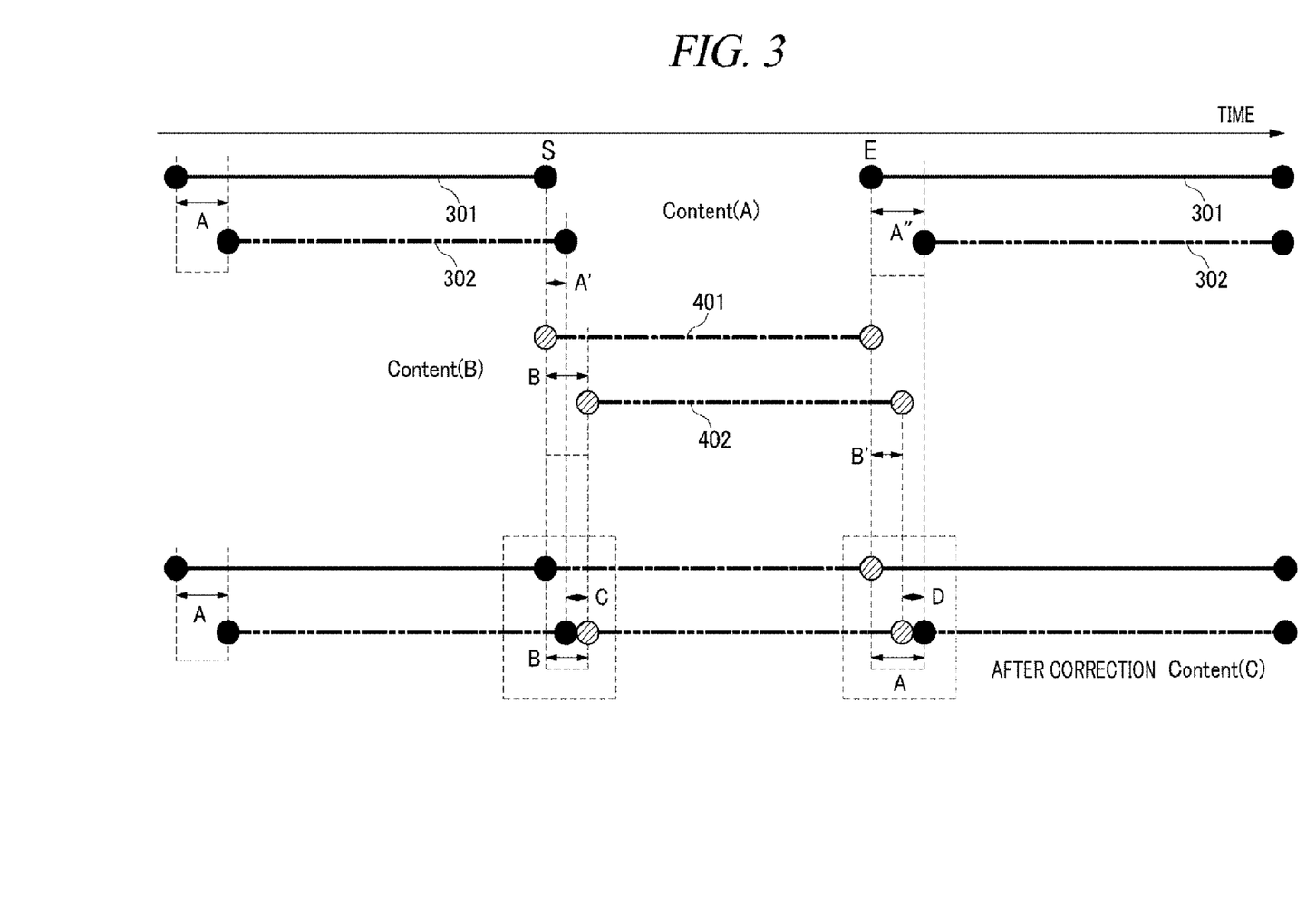
FIG. 3 is an explanatory view for a process of adjusting PTS through a PTS adjustment unit in consideration of information of synchronization errors between video signals and audio signals, in accordance with a preferred embodiment of the present disclosure.

FIG. 3 is an explanatory view which explains a process that PTS adjustment unit 220 adjusts PTS with considering information of an initial synchronization error between video signals and audio signal, in accordance with a preferred embodiment of the present disclosure. Although it is explained that video contents are combined based on video signals, in FIG. 3, it should be noted that the same way is applied to the case where the video contents are combined based on audio signals. That is, while the reference numerals 301 and 401 indicate video signals, and the reference numerals 302 and 402 indicate audio signals, in FIG. 3, video contents can be also combined in the same manner even in the case where the reference numerals 301 and 401 indicate audio signals, and the reference numerals 302 and 402 indicate video signals.

Referring to FIG. 3, the operation of the error correction unit 230 and the PTS adjustment unit 220 will be described.

PTS(The presentation time stamp) indicates how long video frames constructing video signals in video contents should be displayed on a screen, and how long one unit data for audio signals have to be output. The PTS is displayed with accumulated values by lapse of time. Each video frame of video signals has values for start PTS and finish PTS, and the corresponding video frame is displayed to a user from time corresponding to the start PTS to time corresponding to the finish PTS.

For conceptual explanation, it is assumed that: start PTS of a first frame of video signals constructing sports broadcasting videos (Contents A) input from the video source 1(100-1) to the synchronization error correcting apparatus 200 starts from 0 and increases by 1, and finish PTS of the last video frame thereof is 1000; and start PTS of a first frame of video signals constructing commercial videos (Contents B) input from another video source (one of 100-2 to 100-n) starts from 0 and increases by 1, and finish PTS of the last video frame thereof is 100.

And, it is assumed that: when the first half of the sports broadcasting videos input from the video source 1 (100-1) is finished at the time point (time point S) that the PTS reaches 500, and the commercial videos are input to the synchronization error correcting apparatus 200, the synchronization error correcting apparatus 200 combines the commercial videos with the sports broadcasting videos at the time point S to output the combined video to the encoder 300; and when the commercial videos are finished (time point E), the synchronization error correcting apparatus 200 receives input of the sports broadcasting videos once again and combines the sports broadcasting videos immediately after the commercial videos to output the combined video to the encoder 300.

In this case, the sport broadcasting videos and the commercials videos have PTSs set based on their respective time references. To the contrary, the PTS of the video combined the sports broadcasting videos and the commercials videos and outputted from the synchronization error correcting apparatus 200 should be reset based on one time reference.

That is, the video combined the sports broadcasting videos and the commercial videos, and outputted to the encoder 300 (hereinafter, referred to as the "combined video") should be counted starting from a reference time 0. However, after the finish of the first half of the sports broadcasting videos, although the PTS of the combined video is counted from 500, the initial PTS value of the commercial videos should be changed into 500, since the PTS of the commercial videos to be newly inserted starts from 0.

Furthermore, after the commercial videos are combined, the PTS of the combined video is set up to 600, but the sports broadcasting videos (Contents A), which have been stopped and are to be restarted, may start from 500 (in the case where the sports broadcasting videos are recorded in advance, stopped at the time of the combination of the commercial videos, and no longer proceeded with). In this case, the PTS of the sports broadcasting videos that has been set to 500 needs to be reset to 600.

In addition, in the case where the sports broadcasting videos have been continuously transmitted in real time during the combination of the commercial videos but have not input to the synchronization error correcting apparatus 200, the PTS of the sports broadcasting videos at the time point E exceeds 500, so that the PTS time settings between the sports broadcasting videos and the combined video are inconsistent, and thus the PTSs of the respective video frames of the sports broadcasting videos need to be converted to correspond to the PTS of the combined video. To this end, the PTS adjustment unit 220 defines again the PTS of the respective videos to correspond to the PTS of the combined video.

However, the PTS adjustment unit 220 should reset the PTS while maintaining the initial synchronization error between the video signals and the audio signals of the respective video contents. Returning to FIG. 3, there is initially an A amount of errors between the video signals and the audio signals of the sports broadcasting videos, Contents A. This means that the video signals should be first displayed, and the audio signals should be output after lapse of time A so that the video signals and the audio signals are consistent, and thereby, outputting natural videos. If the errors vary during the outputting, videos displayed on a screen and actual sound are unsynchronized, and thereby, causing inconvenience to viewers. Below, a process for combining video signals will be first explained. Then, process for combining audio signals in consideration of synchronization errors will be described.

In the example shown in FIG. 3, the PTS adjustment unit 220 combines Contents A and Contents B by resetting the initial PTS value 0 of Contents B, the commercial videos, to 500 based on the moment that the video signals of Contents A are finished at the time point S (i.e., time point corresponding to the PTS value 500) that the commercial videos are combined. Accordingly, the finish PTS of the last frame of Contents B is reset to 600.

At the time point E that the commercial videos are finished and the sports broadcasting videos are restarted, the start PTS of the first video frame of the video signals of Contents A input once again to the synchronization error correcting apparatus 200 is reset to 600. The finish PTS of the last frame of Contents A is reset to 1100.

As described above, while the video signals are easily combined by resetting the PTS thereof, the PTS for the audio signals are reset in consideration of errors between the audio signals and the video signals of the video contents.

As shown in FIG. 3, Contents A initially have an A amount of errors between the video signals and the audio signals, and contents B initially have a B amount of errors between the video signals and the audio signals. This means that the video signals of Contents A should be output, and the audio signals thereof should be output at the time point that the A amount of time lapses based on the PTS time reference, so that natural videos, in which the videos and the audio are consistent, are output. Likewise, it means that the video signals of Contents B should be outputted, and the audio signals thereof should be output at the time point that the B amount of time lapses based on the PTS time reference, so that natural videos are played.

However, like the video signals, if the PTS adjustment unit 220 combines the audio signals of Contents B at the time point that the audio signals of Contents A are finished, i.e., the time point S, the synchronization error B that should be originally maintained for Contents B is not maintained, and a C amount of time is expedited. Thus, the audio signals are output prior to the video signals that should be output together with the audio signals.

In order to solve this problem, the error correction unit 230 stores initial synchronization error information (A and B) between video signals and audio signals of video contents, and outputs the initial synchronization error information to the PTS adjustment unit 220.

Apart from resetting the PTS of the audio signals, upon receiving the error information, the PTS adjustment unit 220 that the error information inputted resets the PTSs while maintaining an initial synchronization error with original video signals. In the example of FIG. 3, the PTS adjustment unit 220 resets the PTS of the audio signals of Contents B to 600+B obtained by adding the reset PTS value 600 of the video signals of Contents B and the initial synchronization error B.

Meanwhile, even at the time point that the commercial videos, i.e., Contents B are finished, the PTS adjustment unit 220 does not reset the PTS of the audio signals of Contents B to combine the audio signals of Contents B and the audio signals of returned Contents A, and resets the PTS in consideration of the initial synchronization error between the video signals and the audio signals.

As illustrated in FIG. 3, an synchronization error A" occurs between the video signals and the audio signals of Contents A, at the time point E that Contents A are returned. However, the synchronization error may reflect errors accumulated during the complicated processes in which the videos are generated, compressed, and decoded. Thus, the PTS adjustment unit 220 resets the PTS of the audio signals at the time point E by reflecting the initial synchronization error A of Contents A, and not reflecting the synchronization error A" between the video signals and the audio signals of current Contents B. Accordingly, in the example illustrated in FIG. 3, the PTS of the first frame of the audio signals of returned Contents A is reset to "600+A."

Meanwhile, when resetting the PTSs of the video signals and the audio signals is finished, the PTS adjustment unit 220 outputs the video signals, for which PTS resetting is finished, to the FPS adjustment unit 240 in real time, and outputs the audio signals to the resampling unit 260.

The FPS adjustment unit 240 executes converting video contents, which have set to existing different FPS, into FPS requested by the encoder 300. For example, in the case where existing Contents A, which are sports broadcasting videos, and Contents B, which are commercial videos, are set to 30FPS, respectively, and the encoder 300 requests video contents with 15FPS, the FPS adjustment unit 240 adjusts FPS of the video contents input from the PTS adjustment unit 220 and outputs the video contents to the proportion-adjusting unit 250.

There are various applicable methods for converting FPS. The FPS adjustment unit 240 convert a frame rate by preparing start PTS and finish PTS of video frames to be suitable for FPS requested in advance by the encoder 300 and by selecting and allocating a series of video frames input from the PTS adjustment unit 220, one by one.

Figure 4:
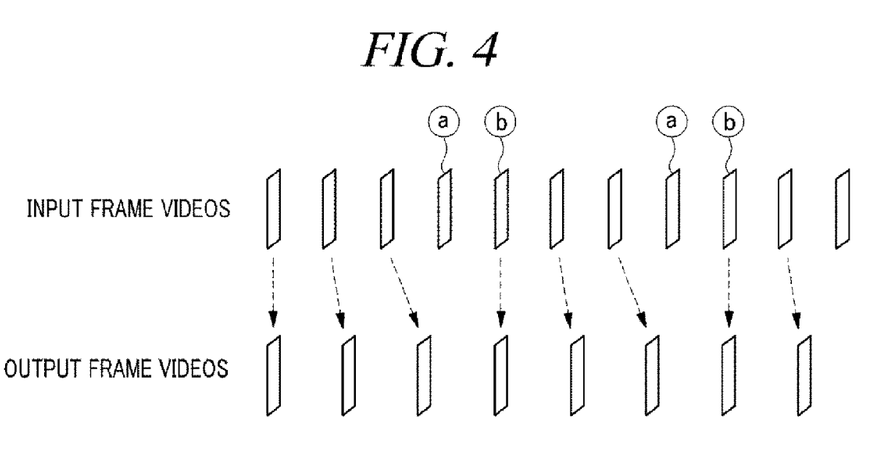
FIG. 4 illustrates one example for adjustment of FPS of video frames.

For example, in FIG. 4 illustrating one example for adjusting FPS of video frames, if start PTS and finish PTS (assuming that the finish PTS is the same as start PTS of a next frame) of video signals to be output have been already set, and the FPS of the videos input in the PTS adjustment unit 220 is higher than the FPS requested by the encoder 300, an input video frame positioned directly before the previously set start PTS of the output video frames is allocated and output as the corresponding start PTS of the output video frames. Accordingly, in FIG. 4, the video frames ⓐ are abandoned, and the video frames ⓑ are allocated and output as output video frames.

If the FPS requested by the encoder 300 is higher than the FPS of the video signals output from the PTS adjustment 220, one input video frame overlaps, so that multiple output video frames are allocated and output. Also, in this case, video frames positioned directly before the previously set output video frames are allocated as output video frames.

The video frames output from the FPS adjustment unit 240 are input to the proportion-adjusting unit 250. The proportion-adjusting unit 250 converts a proportion of the screen into 4:3, 16:10, 16:9, or other proportions based on a screen proportion requested from the encoder 300.

Meanwhile, upon receiving the audio signals from the PTS adjustment unit 220, the resampling unit 260 resamples the audio signals and outputs the audio signals to the encoder 300 as requested by the encoder 300. In this case, a resampling interval is preferably consistent with a proportion for converting the frame rate in the FPS adjustment unit 240.

The synchronization error correcting apparatus 200 in accordance with a preferred embodiment of the present disclosure has been described. Hereinafter, a method for correcting synchronization errors between audio signals and video signals will be described with reference to FIG. 5, which is a flow diagram showing a method for correcting synchronization errors between audio signals and video signals in accordance with a preferred embodiment of the present disclosure.

Figure 5:
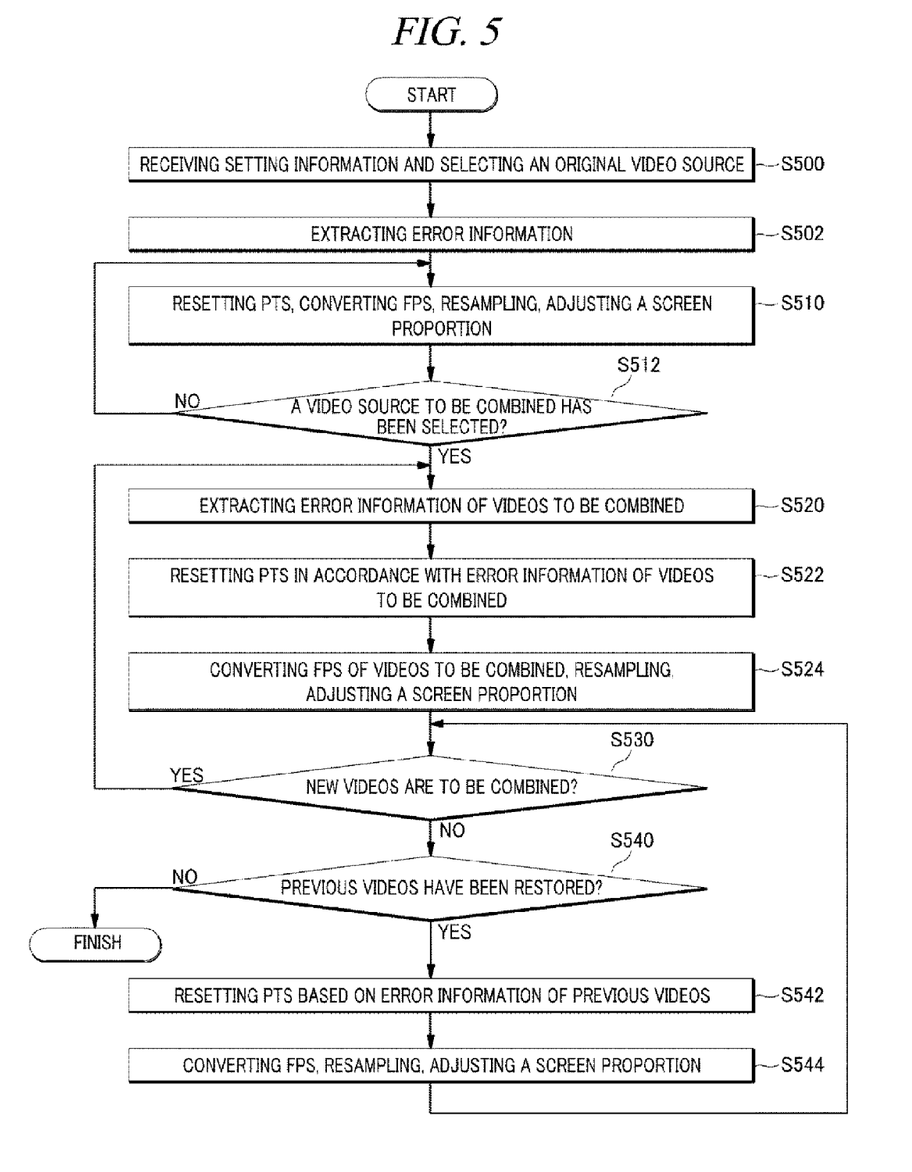
FIG. 5 is a flow diagram showing a method for correcting synchronization errors between audio signals and video signals in accordance with a preferred embodiment of the present disclosure.

Since the method for correcting synchronization errors in accordance with the present disclosure mostly overlaps with the descriptions of the functions of the above-described synchronization error correcting apparatus 200, its process will be simply described below.

First, the synchronization error correction apparatus 200 receives setting information from the encoder 300, and selects a video source for outputting an original source video (to which other video contents will be combined) among the multiple video sources 100-1 to 100-n (S500). The setting information includes FPS information of the combined video generated from combination of multiple video contents, resampling cycle information (resampling information), screen proportion information, and etc.

Once one of the video sources 100-1 to 100-n is selected, video contents from the selected video source are input to the synchronization error correction apparatus 200. The error correction unit 230 of the synchronization error correcting apparatus 200 extracts initial synchronization error information of the video signals and the audio signals of the input video contents (S502).

Then, the synchronization error correcting apparatus 200 resets the PTSs of the video signals and the audio signals of the original video to correspond to the PTS of the video content generated from the combination of the multiple video contents. The synchronization error correcting apparatus 200 converts the FPS of the video signals based on the setting information received from the encoder 300, changes the proportion thereof, and resamples the audio signals (S510).

Meanwhile, the synchronization error correcting apparatus 200 inspects whether a video source of new video contents to be combined to the original video selected during the execution of S502 to S510. If a new video source has not been selected, the synchronization error correcting apparatus 200 repeatedly executes S510 described in regard to the original videos (S512).

If the video source of the new video contents to be combined to the original video contents has been selected, and the video contents thereof are input in S512, the synchronization error correcting apparatus 200 extracts initial synchronization error information between video signals and audio signals of the new video contents (S520), and resets the PTSs based on the initial synchronization error information to combine the new video contents with the original video contents (S522). In S522, as described above, the new videos are combined with the original videos by resetting the PTSs of the video signals and the audio signals of the new videos to be combined while maintaining the errors between the video signals and the audio signals of the new video contents.

Thereafter, the synchronization error correcting apparatus 200 converts the FPS of the video signals of the videos to be combined, adjusts the screen proportion thereof and executes resampling of the audio signals (S524) based on the setting information input from the encoder 300 in S500.

Meanwhile, the synchronization error correcting apparatus 200 inspects whether other new videos are to be combined. If other new videos are to be combined, S520 is proceeded with. If no other videos are to be combined, S540 is proceeded with (S530).

If no new videos are to be combined, the synchronization error correcting apparatus 200 inspects whether the previously input videos have been returned (S540). For example, the synchronization error correcting unit 200 inspects whether the intermediately combined videos (commercial videos) in the foregoing example are finished, and the original videos (sports broadcasting videos) input in S500 are input again.

This case also includes a case where after first videos are input as original videos, second videos are combined to the first videos, third videos are combined to the second videos and then the second videos are returned.

Once the previous videos are returned, the synchronization error correcting apparatus 200 resets the PTSs of the video signals and the audio signals while maintaining the initial synchronization error between the video signals and the audio signals based on the initial synchronization error information extracted from the video contents to be returned (S542).

Thereafter, the synchronization error correcting apparatus 200 converts the FPS of the video signals of the returned videos and adjusts the proportion thereof. The synchronization error correcting apparatus 200 also resamples the audio signals and outputs the audio signals to the encoder 300. Then, S530 is proceeded with (S544).

Although S530 has been proceeded with, the process for correcting synchronization errors between the video signals and the audio signals is finished, unless there are videos to be newly combined, and there are videos to be returned.

The present disclosure may be implemented as a computer readable code in a computer readable record medium. The computer readable medium includes all or any types of recording devices that store data readable by a computer system. Examples of the computer readable record medium include ROM, RAM, CD-ROM, a magnetic tape, a floppy disc, an optical data storage device, and etc. The present disclosure also include that implementing in the form of a carrier wave (e.g., transmission through the Internet). The computer readable record medium is dispersed in a computer system to which the computer readable record medium is connected through a network, and a computer readable code may be stored and executed in the dispersion manner.

The preferred embodiments of the present disclosure have been described. It would be understood by those skilled in the art that various changes and modifications may be made without departing from spirit of the present disclosure. Thus, the foregoing embodiments should be considered in an explanatory aspect, and not in a definitive aspect. The scope of the present disclosure is defined by the following claims. It shall be understood that all modifications equivalent to the scope of the claims are included in the scope of the present disclosure.

What is claimed:

1. A synchronization error correcting apparatus comprising:
   a source selection unit to receive video contents consisting of video signals and audio signals from multiple video sources and outputting the video contents;
   an error correction unit to extract an initial synchronization error set in advance between the video signals and the audio signals of the multiple respective video contents; and
   a PTS adjustment unit to:
      combine the multiple video contents by resetting presentation time stamps (PTSs) of the video signals and the audio signals of the multiple video contents to correspond to PTS of combined video contents generated after combination of the multiple video contents, by:
         setting the PTSs of the video signals and the audio signals such that second video contents are combined in the middle of first video contents, and
         combining remaining portions of the first video contents to an end of the second video contents, while maintaining the initial synchronization error between the video signals and the audio signals of the first video contents when the remaining portions of the first video contents are combined, and
      reset the PTS while maintaining the initial synchronization error between the audio signals and the video signals of the respective combined video contents.

2. The synchronization error correcting apparatus of claim 1,
   further comprising a FPS adjustment unit for adjusting frame per second (FPS) of the video signals of the combined video contents based on FPS setting information included in setting information input from an encoder.

3. The synchronization error correcting apparatus of claim 2,
   wherein the FPS adjustment unit adjusts the FPS of the video signals of the combined video contents by setting a time position of each video frame after the adjustment of the FPS based on the FPS setting information and using a video frame directly before the time position of the video frame set based on the FPS setting information among video frames of the video signals of the combined video contents prior to the FPS adjustment.

4. The synchronization error correcting apparatus of claim 2,
   further comprising a proportion-adjusting unit for adjusting a screen proportion of the video signals of the combined video contents that the FPS have been adjusted, based on screen proportion setting information included in the setting information input from the encoder.

5. The synchronization error correcting apparatus of claim 1,
   further comprising a resampling unit for resampling the audio signals that the PTS have been adjusted, based on resampling information included in the setting information input from an encoder.

6. A method for correcting synchronization error, which is performed in a synchronization error correcting apparatus that corrects synchronization errors between video signals and audio signals of multiple video contents input from multiple video sources and combines and outputs the multiple video contents, comprising:
   receiving first video contents from the video sources, including extracting an initial synchronization error of first video contents;
   generating initial synchronization error information by receiving second video contents to be combined to the first video contents from the video sources, and extracting an initial synchronization error between video signals and audio signals of the second video contents;
   combining the second video contents to the first video contents based on the initial synchronization error information while maintaining the initial synchronization error between the video signals and the audio signals of the second video contents, including combining the second video contents in the middle of the first video contents while maintaining the initial synchronization error of the second video contents; and
   combining the first video contents to an end of the second video contents while maintaining the initial synchronization error of the first video contents, after the combination of the second video contents is finished.

7. The method for correcting synchronization error of claim 6,
   wherein the synchronization error correcting apparatus combines the first video contents and the second video content, by resetting PTSs of the first video contents and the second video contents to correspond to PTS of combined videos generated from the combination of the first video contents and the second video contents.

8. The method for correcting synchronization error of claim 7,
   wherein the synchronization error correcting apparatus converts FPS of video signals of the combined video contents, resamples audio signals thereof, and
   outputs the video signal of the combined video contents, based on FPS setting information and resampling setting information received from an encoder.

9. The method for correcting synchronization error of claim 8,
   wherein the synchronization error correcting apparatus adjusts the FPS of the video signals of the combined video contents by setting a time position of each video frame of the combined video contents after the adjustment of the FPS based on the FPS setting information and using a video frame directly before the time position of the video frame set based on the FPS setting information among video frames of the video signals of the combined video contents prior to the FPS adjustment.

10. The method for correcting synchronization error of claim 7,
    wherein the synchronization error correcting apparatus adjusts a proportion of the video frames of the video signals of the combined video contents that the FPS have been converted, based on screen proportion setting information received from the encoder and outputs the video signal of the combined video contents.

11. A record medium recording the method for correcting synchronization error of claim 6 with a program code that can be read and executed in a computer.

12. A record medium recording the method for correcting synchronization error of claim 7 with a program code that can be read and executed in a computer.

* * * * *